(12) United States Patent
Leeper, II

(10) Patent No.: US 7,411,774 B2
(45) Date of Patent: Aug. 12, 2008

(54) VOLTAGE VARIABLE CAPACITOR

(76) Inventor: William F. Leeper, II, 2223 Orange Blossom St., San Antonio, TX (US) 78247

( * ) Notice: Subject to any disclaimer, the term of this patent is extended or adjusted under 35 U.S.C. 154(b) by 4 days.

(21) Appl. No.: 10/858,187

(22) Filed: Jun. 1, 2004

(65) Prior Publication Data

US 2007/0242410 A1 Oct. 18, 2007

(51) Int. Cl.
*H01G 5/01* (2006.01)
(52) U.S. Cl. ............... 361/277; 361/272; 361/278; 361/286; 361/290; 361/292
(58) Field of Classification Search ......... 361/272–277, 361/278–280, 283.3, 290, 292, 283.1, 283.2, 361/283.4, 287
See application file for complete search history.

(56) References Cited

U.S. PATENT DOCUMENTS

| | | | | |
|---|---|---|---|---|
| 4,490,772 | A | * | 12/1984 | Blickstein .................... 361/281 |
| 5,084,801 | A | * | 1/1992 | El-Hamamsy et al. ...... 361/277 |
| 6,088,214 | A | * | 7/2000 | Malone et al. ............... 361/278 |
| 6,229,684 | B1 | * | 5/2001 | Cowen et al. ................ 361/278 |
| 6,242,989 | B1 | * | 6/2001 | Barber et al. ........... 331/177 V |
| 6,361,331 | B2 | * | 3/2002 | Fork et al. ..................... 439/81 |
| 6,498,712 | B1 | | 12/2002 | Ditlya |
| 6,625,004 | B1 | * | 9/2003 | Musolf et al. ................ 361/278 |

OTHER PUBLICATIONS

"The 565 Analog PLL", <http://www.du.edu/~etuttle/electron/elect12.htm>, University of Denver, Dr. Elizabeth R. Tuttle, May 7, 2004.
"Permittivity"; Wikipedia, <http://en.wikipedia.org/wiki/Permittivity>; May 28, 2004.
"Factors Affecting Capacitance"; <http://www.allaboutcircuits.com/vol_1/chpt_13/3.html>; May 28, 2004; vol. 1.
National Semiconductor; LM565/LM565C Phase Locked Loop; Data Sheet; May 1999.

* cited by examiner

*Primary Examiner*—Nguyen T Ha
(74) *Attorney, Agent, or Firm*—Krammer Browning PLLC

(57) ABSTRACT

A charge storage device having a capacitance that is variable by alteration of the relative permittivity of the dielectric positioned between conductive electrodes within the device. The device consists of two conductive plates sandwiching a conductive grid, typically embedded within a dielectric material. Charging the grid with a negative or positive potential changes the value of the dielectric constant (the relative permittivity) and thereby changes the capacitance of the device.

10 Claims, 3 Drawing Sheets

VOLTAGE VARIABLE CAPACITOR

BACKGROUND OF THE INVENTION

1. Field of the Invention

The present invention relates generally to electronic components suitable for receiving and retaining an electrical charge. The present invention relates more specifically to a charge storage device having a capacitance that is variable by alteration of the relative permittivity of the dielectric positioned between conductive electrodes within the device.

Applicant's novel device consists of two conductive plates sandwiching a conductive grid, typically embedded within a dielectric material. Charging the grid with a negative or positive potential changes the value of the dielectric constant (the relative permittivity of the dielectric) and thereby changes the capacitance of the device.

2. Description of the Related Art

Capacitors in general are important electrical/electronic components that are used in a variety of devices from basic power supply circuit boards to more complex computer systems. Capacitors are generally fabricated or constructed in two main forms, fixed and variable. A fixed capacitor has a preset capacitance that is established during the manufacture of the device through the selection of the dielectric material and the conductive plates that enclose the dielectric material. Variable, or trimmed capacitors, do not have set capacitance values fixed during their manufacture. Instead, variable capacitors are designed to allow a range of capacitance values by adjusting some feature of the capacitor to alter its capacitance value. Adjustment of a capacitor through its range of capacitance values may, for example, allow the fine tuning of an electronic circuit and various operational features of the circuit. Variable capacitors are therefore often utilized in electromagnetic wave transmitter and receiver circuitry to vary the frequency response for such transmitters and receivers.

Variable capacitors themselves come in a number of different structural and functional configurations. One of the most common methods of varying the capacitance is to interleave several movable plate electrodes among a number of fixed plate electrodes. Adjusting the position of the variable electrodes, relative to the fixed electrodes, increases or decreases the capacitance as the area between the electrodes changes. One problem with this type of variable capacitor is simply the number of electrodes that are required to implement the method of varying the capacitance. Multiple fixed and variable electrodes are required, and these electrodes themselves require a housing large enough to accommodate both them and their relative motion. In many instances, the size and geometry of such devices become unsuitable for small scale electronic applications. In addition, if the fixed and variable electrodes are not carefully structured and positioned, the capacitor may be easily damaged such that the geometry of the electrode plates changes in an undesired manner resulting in an inappropriate change in the capacitance.

In general, the capacitance value of a capacitor depends upon three factors. These include the distance between the electrode plates of the capacitor and the area (a two dimensional value) between the two electrodes or plates. A third factor not normally considered when constructing a variable capacitor is the relative permittivity of the dielectric material utilized. Most existing variable capacitors adjust either the distance between the two plates, and/or the area between the plates in order to adjust the capacitance value. In either case, mechanical motion is required in order to make these adjustments. It would be desirable if the capacitance value of a capacitor could be varied without the need for the mechanical motion of any of the components associated with the construction of the capacitor. Towards this end, the third factor involved in the capacitance value, the relative permittivity, may be examined as a basis for changing the capacitance value without requiring mechanical motion of the components.

The relative permittivity is, as mentioned above, also known as the dielectric constant, and is a relative measured value that depends on the material chosen for the dielectric. It is expressed as the ratio of a material's absolute permittivity to the absolute permittivity of a vacuum (see Equation 1 below).

In the field of electronics, capacitors are most often considered discrete electronic components that store electrical energy in the form of a static charge. A basic capacitor consists of two metal plates that are separated by a dielectric (insulator). One of the electrical properties of the dielectric insulator material is the ability to store a static electric charge. Capacitors are normally classified by the type of dielectric used in their construction (mica, ceramic, Mylar®, air, electrolytic, etc.) Each of the difference types of capacitors has a range of capacitance values that is generally determined by the geometry of the plates and the dielectric.

Once again to summarize, the capacitance value of a capacitor is the result of three variables:

A. the surface area of the two plates;
B. the distance between the two plates; and
C. the dielectric constant of the dielectric.

Capacitance values are measured in farads. Most fixed (non-variable) capacitors have a capacitance value between 1000 microfarads and 1 picofarad. There are, as mentioned above, a variety of variable capacitors known in the art. Existing variable capacitors operate on one of two principles, both of which require some form of mechanical movement. First, some variable capacitors change their capacitance value by changing their plate area. Second, some variable capacitors change their capacitance value by changing the distance between their plates.

Varactor or tuning diodes are also sometimes used as capacitors. A varactor or tuning diode is typically a semiconductor device that changes its capacitance by changing the width of its depletion region. Varactor diodes are typically limited to the picofarad range.

As mentioned above, capacitors are one of the most frequently used components in electronic circuits. One of the most common uses for variable capacitors is in tuning circuits. For example, the frequency tuner knob on a typical radio receiver is connected to a variable capacitor such that turning the knob changes the capacitance value of the capacitor, which changes the frequency of the radio signal that the radio receives. A variety of other uses of variable capacitors may be found in the literature that involve altering the characteristics of an RC circuit (a fundamental circuit component) by varying the capacitance value at some point in the circuit.

The voltage variable capacitor proposed herein is a modified form of existing capacitors. FIG. 1 shows in general how a conductive grid may be placed within a dielectric and connected to its own terminal. Charging the conductive grid with a negative potential causes the dielectric constant of the capacitor to decrease in value thereby reducing the capacitor's value. Placing a positive potential on the grid causes the dielectric constant to increase, thereby raising the capacitor's value.

The dielectric constant (or relative permittivity, $\epsilon_r$) is a relative measure. It is expressed as the ratio of a material's absolute permittivity ($\epsilon$) to the absolute permittivity of a vacuum ($\epsilon_o$):

$$\epsilon_r = \epsilon/\epsilon_o \quad \text{EQUATION 1}$$

Total capacitance expressed in terms of the physical parameters of the capacitor may be expressed by the following equation:

$$C = \frac{A\varepsilon_r(8.85 \times 10^{12} F/m)}{d} \quad \text{EQUATION 2}$$

As discussed above, existing variable capacitors vary the area (A) or the distance between the plates (d) in order to change the capacitance value (C). Both require a change in the physical parameters of the capacitor. In the present invention the relative permittivity ($\epsilon_r$) is changed with a static charge on the conductive grid which changes the overall capacitance value without the requirement of any mechanical change in the capacitor. This is the principle by which the present invention operates. It can be seen therefore, from Equation 2, that an increase in the relative permittivity results in an increase in the capacitance value while a decrease in the relative permittivity results in a decrease in the capacitance value. It is known that altering the electromagnetic field within or surrounding a dielectric material will alter the relative permittivity of the dielectric. It is upon this principle that the present invention is based. As a practical matter, there are no limitations as to the size or geometry of the capacitor of the present invention or the type of dielectric material used.

Thus, the present invention provides a first plate capable of storing a charge therein in electrical contact with a first terminal of a source of power distribution. A second plate is spaced apart from the first plate and is in electrical contact with a second terminal of the source of power distribution. A dielectric material occupies the space between the plates as does the grid. The grid is attached to a means of charging, including variably charging the grid.

The grid of the present invention is typically comprised of a conductive material. The dielectric of the present invention is typically an insulator. Direct voltage or alternating voltage may be used as a means for charging the grid. The direct current may be variable. An exemplary method of using the capacitor of the present invention would be to vary the charge on the grid to achieve desired and selected electrical characteristics in a circuit. This may be done by varying the voltage, for example, to the grid and/or using a resistance in series with a power source and the grid.

DETAILED DESCRIPTION OF THE PREFERRED EMBODIMENTS

Figure 1:
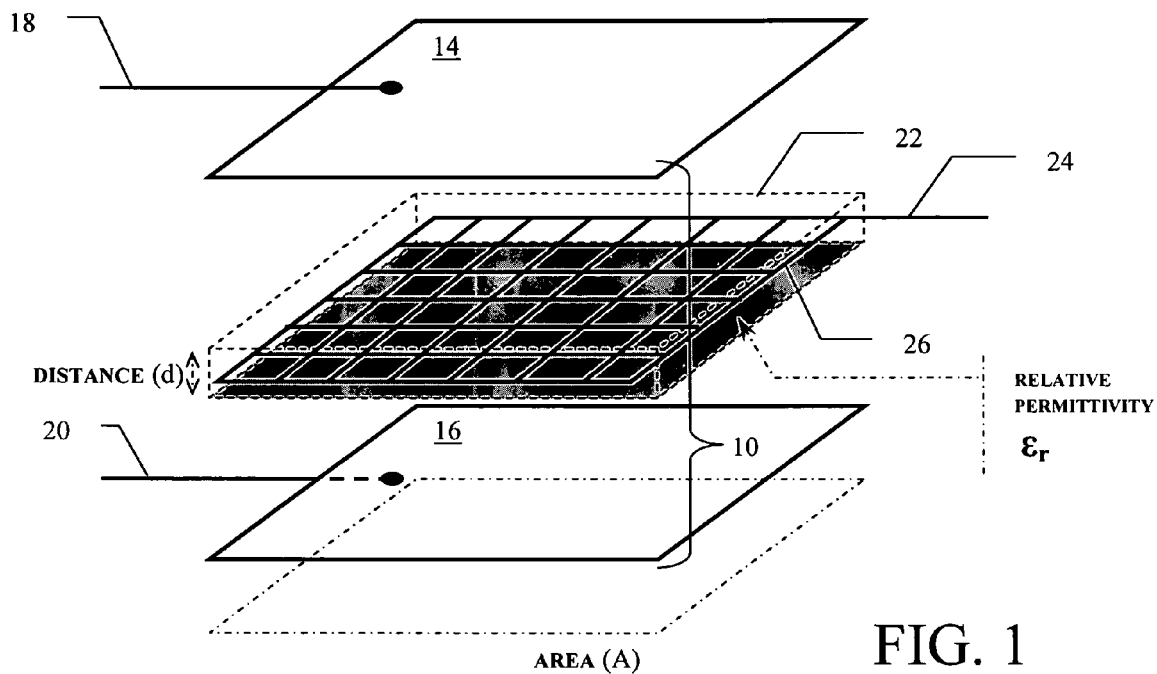
FIG. 1 is an exploded perspective schematic view of the variable capacitor of the present invention showing the dimensional elements of relevance.

Reference is made first to FIG. 1 for a detailed description of the structure and function of a variable capacitor according to the present invention. The structure of variable capacitor 10 is shown schematically in FIG. 1. It will be understood by those skilled in the art that the geometry and size of the various elements of the capacitor described could change depending upon the specific application. Initially it can be seen that the fundamental elements of variable capacitor 10 of the present invention are the same as the fundamental elements of all capacitance devices. The basic capacitor is comprised of first conductive plate 14 positioned parallel to, but spaced apart from, second conductive plate 16. Each of these two plates 14 and 16 define an area (A) between them that is a factor in determining the capacitance of the device. First conductive plate 14 is connected to electrical conductor 18 and second conductive plate 16 is likewise connected to electrical conductor 20 for connecting capacitor 10 into a circuit as discussed in more detail below.

Again, as may be typical of most capacitors, dielectric material 22 is positioned between plates 14 and 16. The thickness of dielectric material 22 will typically define the distance (d) between plates 14 and 16. This distance (d) is also a factor in determining the capacitance value of the assembled capacitor. FIG. 1 is an exploded perspective view of the structural elements of variable capacitor 10 of the present invention. When fully assembled for use, plates 14 and 16 would be in direct contact with the top and bottom surfaces respectively of dielectric material 22. In this manner, the relevant distance (d) between plates 14 and 16 becomes the thickness of dielectric material 22.

Dielectric material 22 will have a relative permittivity ($\epsilon_r$) that is characteristic of the type of material utilized. Various insulator and/or semiconductor compositions may be used for the dielectric material. The selection of the dielectric in the present invention may be made in accord with standard practices for constructing capacitor devices. The integration of the novel features of the present invention in to standard elements of a capacitor does not dramatically alter the criteria for selecting dielectric materials, or for defining the geometry of the conductive plates.

Integrated into dielectric material 22, is conductive grid 26. Electrical conductor 24 is connected to conductive grid 26 and provides the means for establishing a charge on the grid. When fully assembled, therefore, conductive plate 14 and conductive plate 16 sandwich dielectric material 22, with its incorporated conductive grid 26, into the electronic component package referenced generally as variable capacitor 10. Use of the capacitive device involves establishing a charge on conductive grid 26 by means of electrical conductor 24, and varying the charge on grid 26 so as to alter the relative permittivity ($\epsilon_r$) of dielectric material 22. In this manner (according to the capacitance Equation 2 discussed above) the capacitance value of the variable capacitor will change as the relative permittivity of the dielectric material changes. Typically the establishment of a charge on grid 26 will involve placing grid 26 at a potential above (positive potential) or below (negative potential) ground, relative to charges that may be established on plates 14 and 16.

The structure and geometry of grid 26 may vary, although certain factors are important to the efficient operation of the electronic capacitance component. In order for the change in a charge on the grid to effect a change in the value of the dielectric, the grid must come into contact with as much of the dielectric material as possible. Dielectric materials of greater strength will require grid networks of much smaller proportions as even modest changes in the charge on the grid will effect significant changes in the dielectric constant. On the other hand, if the grid area is too large, it can effectively act as an additional plate within the capacitive device. This may result in the charge signal being removed through the grid conductor 24, although in some instances, this may itself be a desirable feature.

In general, the grid should be of minimal conductor dimensions, i.e. micro fine in its conductive paths, but should be large enough in geometry to efficiently affect the dielectric value.

Figure 2:
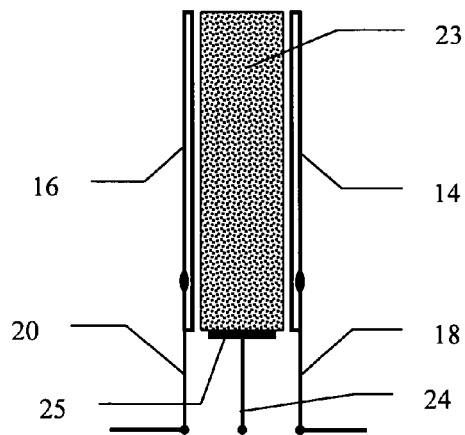
FIG. 2 is a schematic, cross-sectional diagram of an alternate preferred embodiment of the variable capacitor of the present invention.

Referring again to FIG. 1, and recognizing the schematic nature of the diagram, it should be noted that the conductive grid 26 may be placed in any type of dielectric material 22, such that there would be no limitations on the size of the capacitor constructed. It is also possible to utilize a doped semiconductor as the dielectric, in which case the semiconductor material may be charged without the use of a grid placed within it. FIG. 2 shows, in schematic detail, the manner in which a semiconductor material may be utilized as the dielectric. Semiconductor material 23 is positioned between plates 14 and 16 in a manner similar to the structure described above with regard to FIG. 1. Electrical conductors 18 and 20 are also positioned similarly on plates 14 and 16. Instead of a grid, however, a charge may be established within dielectric (semiconductor) material 23 by means of a contact electrode 25 positioned along one edge of the material. Electrical conductor 24 provides the means for providing a potential to the contact electrode 25.

Figure 3A:
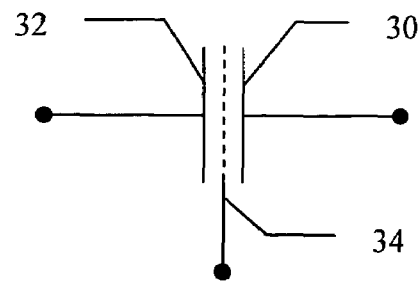
FIG. 3A illustrates a proposed electronic schematic symbol for the variable capacitor of the present invention.
Figure 3B:
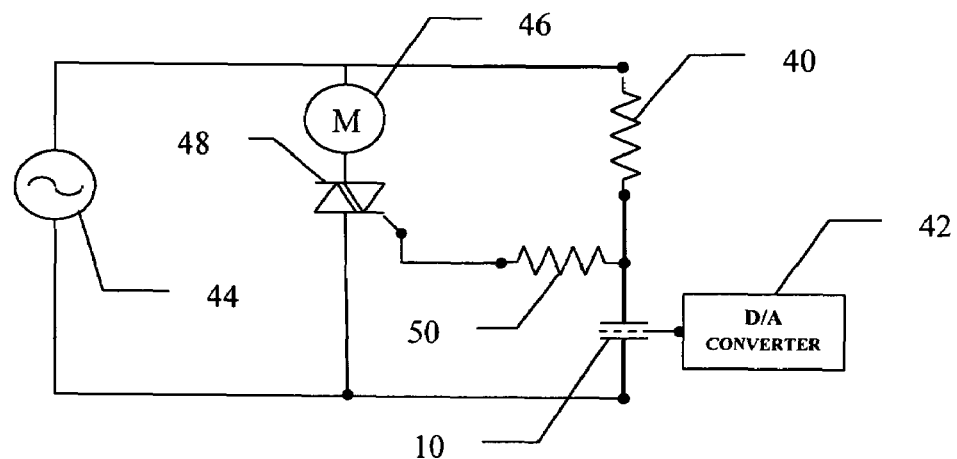
FIG. 3B is an electronic schematic illustrating use of the variable capacitor of the present invention in a digital/analog converter circuit for motor control.
Figure 3C:
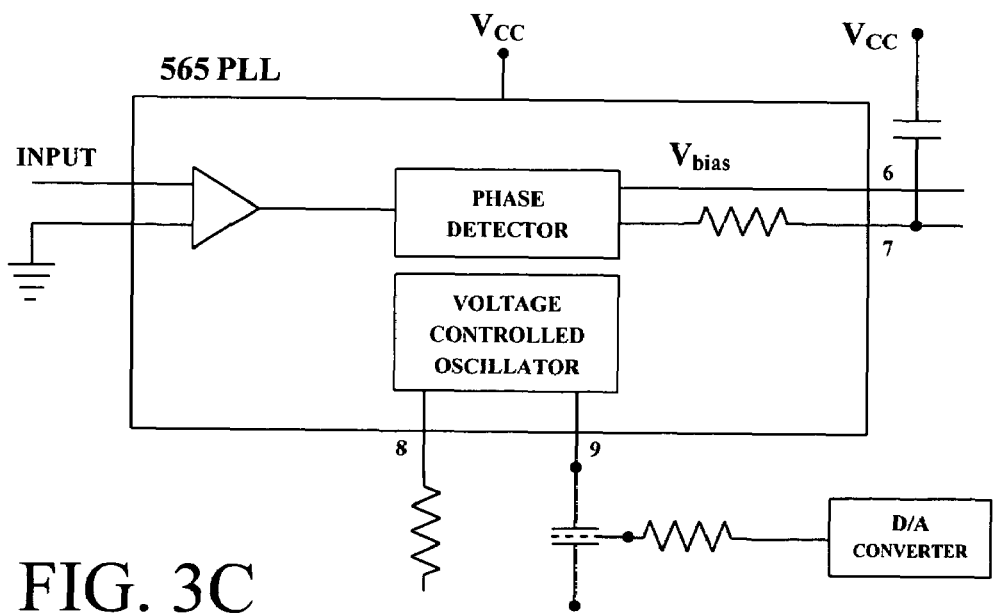
FIG. 3C is an electronic schematic illustrating use of the variable capacitor of the present invention in a phase locked loop circuit.

Reference is now made to FIGS. 3A-3C for a brief discussion of various uses of the capacitor of the present invention and its designation in electronic circuit schematics. FIG. 3A is simply a suggested schematic diagram for the variable capacitor of the present invention showing the standard plates 30 and 32 of a typical capacitor with an intermediate grid 34 and a conductor to the grid for providing a voltage potential and thus a charge on the grid.

FIG. 3B shows a very simple electronic schematic of a motor control circuit utilizing the variable capacitor of the present invention. Voltage variable capacitors may be used in any RC controlled network such as that shown in FIG. 3B. The majority of motor controlled circuits use an RC network to control the firing angle of a triac or SCR. The circuit shown in FIG. 3B uses a digital signal applied to D/A converter 42 to produce a DC voltage applied to the grid of the voltage variable capacitor 10 of the present invention. This changes the firing angle of triac 48, and therefore, the power delivered to motor 46 from AC power source 44.

Reference is now made to FIG. 3C for another example of the use of the variable capacitor of the present invention in a typical electronic circuit. FIG. 3C shows a phase locked loop control circuit based on a 565 Analog PLL type chip. The circuit shown has a center frequency dependent on the values of the resistor on pin 8 and the capacitor on pin 9. Varying the capacitor enables this circuit to have a greater range of center frequencies. Again, a digital signal produces a voltage which varies the value of the capacitor, thus changing the center frequency of the circuit.

It should be noted that if a DC power source is used to charge the dielectric material in the variable capacitor of the present invention, it may be necessary to connect a high value of resistance in series with the grid since DC power sources are essentially at ground potential to an AC signal. That is, the grid would act as an additional plate under these conditions unless an appropriate resistor is placed in series.

Figure 4:
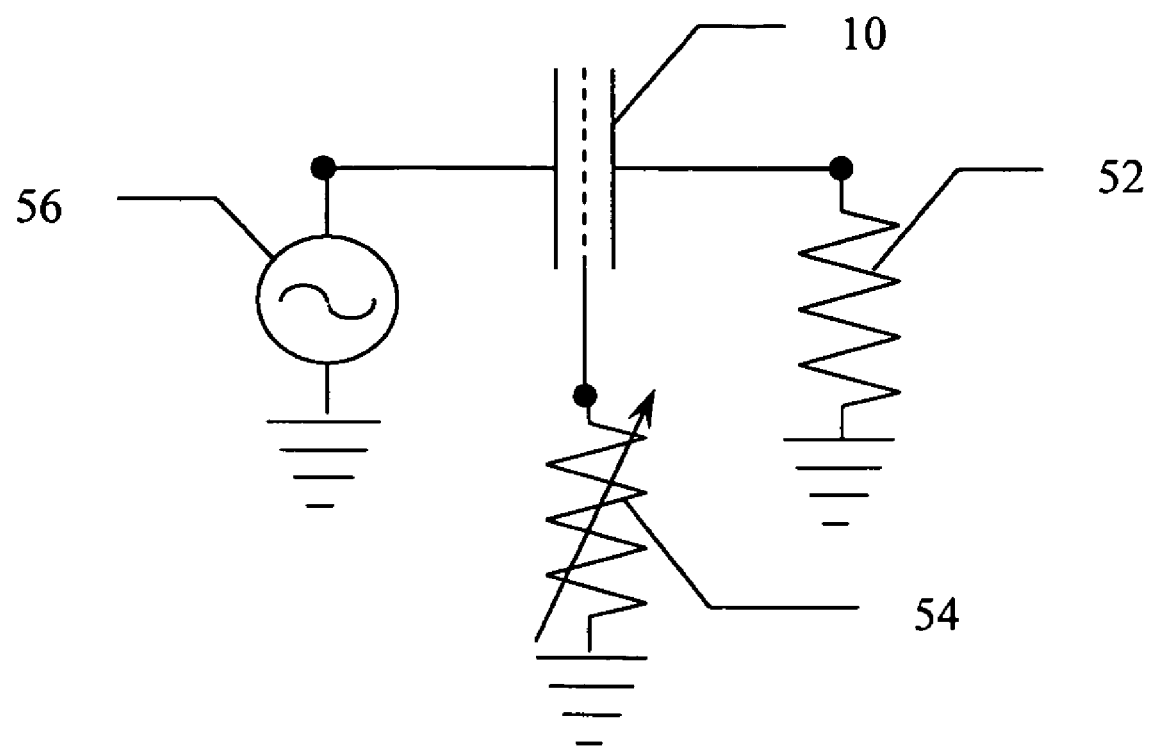
FIG. 4 is a generalized electronic schematic illustrating a method of using the variable capacitor of the present invention to regulate conduction from the grid to ground, thereby reducing the value of the capacitor.

Reference is finally made to FIG. 4, wherein a variable resistor 54 is connected to the grid of variable capacitor 10 of the present invention to allow some of the signal to pass directly from capacitor 10 to ground. In this process variable resistor 54 becomes the mechanism whereby the value of capacitor 10 may be varied within the circuit containing AC power source 56 and load 52.

Although the present invention has been described in conjunction with a number of preferred embodiments it will be understood by those skilled in the art that alternative embodiments are possible without departing from the fundamental basis of the present invention. As indicated above, the choice of the specific dielectric to be utilized in conjunction with the present invention may be made according to known dielectric properties within the electronics field. Likewise, the specific geometries of the components of the variable capacitor of the present invention will be a matter of choice dependent of the specific application of the capacitive device. Dielectric materials and plate geometries may be chosen according to the same criteria utilized in conjunction with establishing fixed capacitor values, recognizing that the incorporation of a gird as described herein will result in the capacitor having a range of values about that of a similar fixed value device.

The examples of circuits given above are not intended to be limiting of the possible applications of a device constructed according to the present invention. Those skilled in the art will readily recognize many other applications that could benefit from the use of the variable capacitor of the present invention.

I claim:

1. An electronic component device for receiving and storing an electrical charge, the device comprising:
    a first plate capable of storing a charge therein, said first plate in electrical contact with a first conductor terminal;
    a second plate capable of storing a charge therein, said second plate spaced apart from said first plate and in electrical contact with a second conductor terminal;
    a dielectric material occupying the space between said first and second plates;
    a grid capable of storing a charge therein, said grid positioned between said first and second plates within said dielectric material; and
    means for charging said grid.

2. The device of claim 1, wherein said grid comprises a conductive material.

3. The device of claim 1, wherein said dielectric comprises a non-conductive material.

4. The device of claim 1, wherein said means for charging said grid is a direct current voltage source.

5. The device of claim 4, wherein said direct current voltage source is variable in voltage.

6. The device of claim 1, wherein said means for charging said grid is placed in series with a resistor.

7. The device of claim 1, wherein said means for charging said grid is placed in series with a variable resistor.

8. The device of claim 1, wherein said means for charging said grid is an alternating current voltage source.

9. The device of claim 1, wherein said dielectric material has a relative permittivity in the range of 2.0 to 10.0 in the absence of an electromagnetic charge.

10. An impedance matching circuit in operative association with a transmission line or wave guide, the circuit comprising:
   a variable capacitor including a first plate capable of storing a charge therein, in electrical contact with a first terminal of a source of power distribution; a second plate, spaced apart from the first plate and in electrical contact with a second terminal; a dielectric material occupying the space between the plates; a grid between the plates; and
   a means of varying the charge on the grid;
   wherein the charge on the grid is adjusted so that the impedance of the circuit matches the impedance of the transmission line or wave guide.

* * * * *